No. 663,898. Patented Dec. 18, 1900.
W. HOLMES.
DEVICE FOR USE IN SECURING RUBBER TIRES ON VEHICLE WHEELS.
(Application filed Feb. 21, 1900.)
(No Model.) 2 Sheets—Sheet 1.
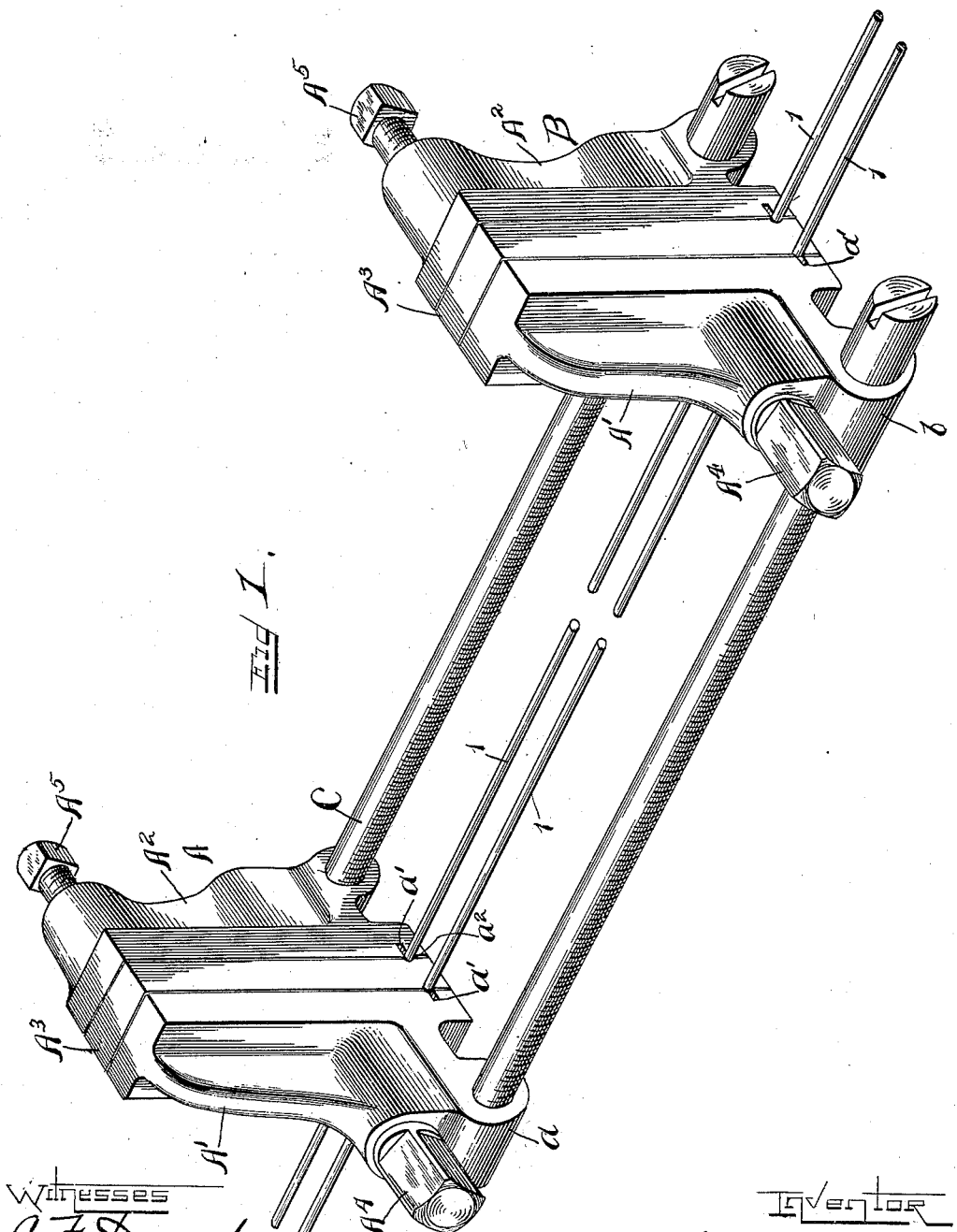

No. 663,898. Patented Dec. 18, 1900.
W. HOLMES.
DEVICE FOR USE IN SECURING RUBBER TIRES ON VEHICLE WHEELS.
(Application filed Feb. 21, 1900.)
(No Model.) 2 Sheets—Sheet 2.
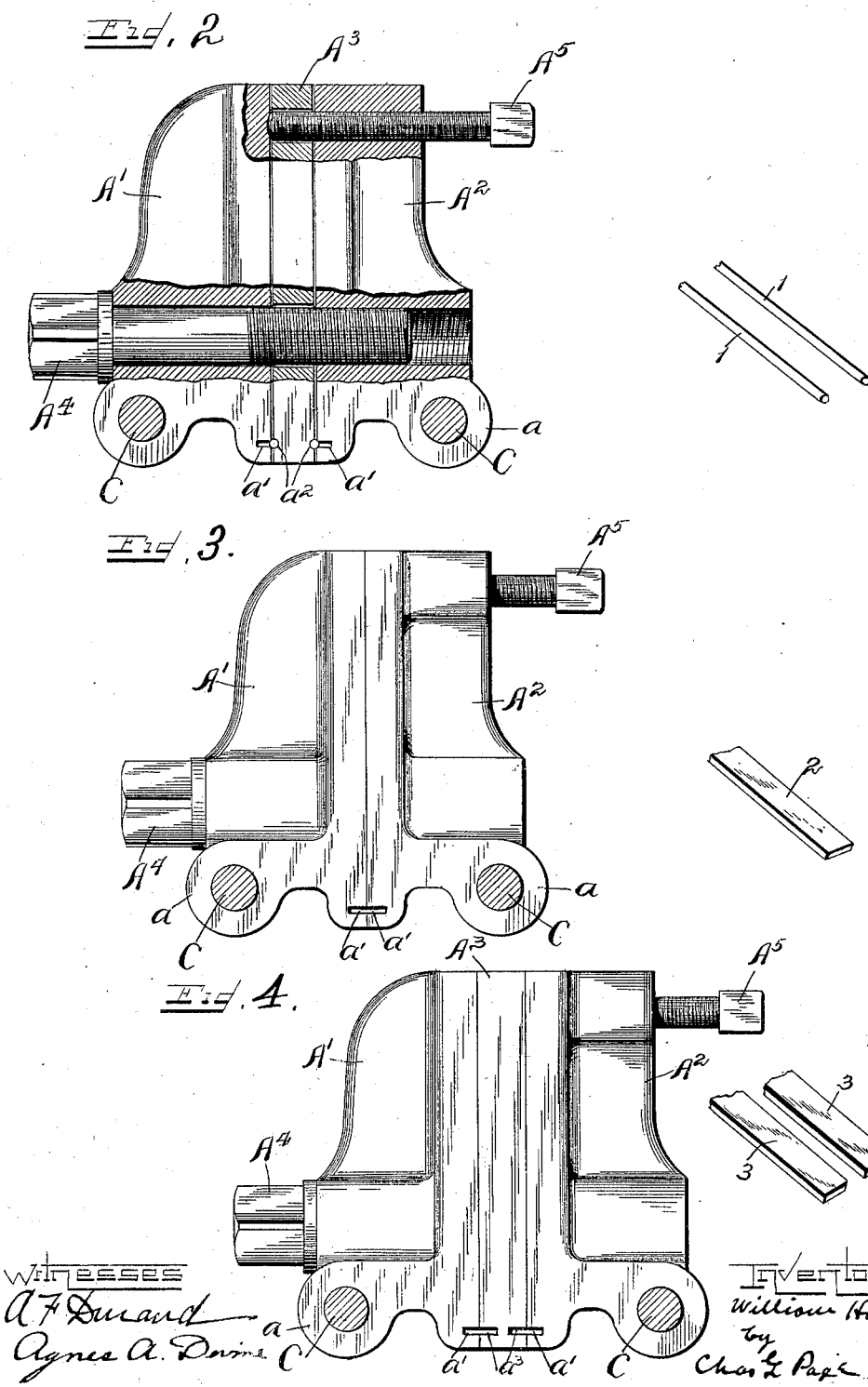

UNITED STATES PATENT OFFICE.

WILLIAM HOLMES, OF CHICAGO, ILLINOIS, ASSIGNOR TO THE MORGAN & WRIGHT, OF SAME PLACE.

DEVICE FOR USE IN SECURING RUBBER TIRES ON VEHICLE-WHEELS.

SPECIFICATION forming part of Letters Patent No. 663,898, dated December 18, 1900.

Application filed February 21, 1900. Serial No. 6,036. (No model.)

*To all whom it may concern:*

Be it known that I, WILLIAM HOLMES, a citizen of the United States, residing at Chicago, county of Cook, State of Illinois, have invented certain new and useful Improvements in Devices for Use in Securing Elastic Tires Upon Vehicle-Wheels, of which the following is a specification.

The objects of my invention are to provide a simple, serviceable, and an easily-operated device for holding the retaining bands or wires of an elastic tire under tension while the tire is being secured upon the rim of a vehicle-wheel, and particularly to provide a device of this character which can be employed in connection with tires having either one or two retaining bands or wires, to provide a clamp which will effectually grip the said bands or wires, and to provide a device which will render the operation of securing elastic tires upon vehicle-wheels less difficult than heretofore.

To the attainment of the foregoing and other useful ends my invention consists in matters hereinafter set forth and claimed.

In the accompanying drawings, Figure 1 is a perspective of a device embodying the principles of my invention. Fig. 2 is a side elevation, partly in section, of one of the clamps shown in Fig. 1. Fig. 3 is a view similar to Fig. 2, but showing the clamp in condition to grip a flat band instead of the two wires shown in the preceding views. Fig. 4 shows a clamp adapted to grip two flat retaining-bands.

As thus illustrated, the device comprises the two clamps A and B, which are, as shown in Figs. 1 and 2, adapted to grip the end portions of the retaining-wires 1, it being understood that these wires extend through the elastic tire and project from the ends thereof and that in securing the tire upon the wheel these projecting end portions are lapped and joined, while the clamps hold the wires under tension. The two clamps are connected for relative adjustment preferably by means of tension-screws C. These screws are arranged to extend through lugs $a\ a$ and $b\ b$, which project laterally from the sides of the two clamps. The threaded end portions of the said screws engage threaded openings in the lugs $a\ a$, while their unthreaded portions extend through unthreaded openings in the lugs $b\ b$. In this way the two clamps can be adjusted either toward or away from each other by rotating the screws C. By rotating the screws in the right direction the two clamps can be drawn together, and by so doing the retaining-wires will of course be placed under tension, and their ends can then be lapped and joined in any suitable manner. The two clamps are similar in form and construction, and for this reason a description of one will suffice for both. For instance, the clamp A (shown in Fig. 2) consists of a couple of jaws A' and $A^2$ and a plate or block $A^3$. The said plate or block is, it will be observed, arranged between the opposing faces or surfaces of the two jaws, and the latter are connected by an adjusting-screw $A^4$, which extends through an unthreaded opening in the plate. The lower end portion of each jaw is provided with a notch $a'$, and the lower end portion of the plate $A^3$ is provided with notches $a^2$, which are opposite the notch $a'$ and which coöperate with the latter in gripping or holding the retaining-wires 1. When adjusted into place and when the bolt $A^4$ is tightened sufficiently, the wires are clamped tightly between the opposing faces of the plate and jaws and are engaged by the notches $a'$ and $a^2$ in the manner illustrated by Figs. 1 and 2. In order to enable the clamp to more effectively grip the wires, I provide a screw or bolt $A^5$, which extends through the upper end portions of the jaw $A^2$ and plate $A^3$ and which impinges or bears against the face of jaw A', the screw by extending through a threaded opening in the jaw and an unthreaded opening in the plate serving also as a means for holding the plate in place and preventing it from swinging out of line with the jaws. With this provision and after tightening the bolt or screw $A^4$ the pressure of the jaws upon the wires can be increased by rotating the screw $A^5$, so as to force the upper ends of the jaws apart, it being observed that in so doing the two jaws act as levers, with the adjusting-bolt $A^4$ serving as a fulcrum. In this way the effectiveness of the grip upon the wires is increased and liability of slip is obviated or greatly reduced. The leverage is increased by inserting the bolt $A^4$ through the jaws at a point nearer their lower ends than their upper ends. The thickness of the plate $A^3$ can be varied according to the distance between the two wires.

In Fig. 3 the clamp is shown in condition for use with tires having a single flat band instead of the two wires. In this view it will be seen that the plate $A^3$ is removed and that the notches $a'$ receive the edges of the band 2 and that the tightening or drawing together of the jaws operates to compress the band edgewise.

Fig. 4 is a view showing the plate $A^3$ interposed between the two jaws; but in this case the plate is provided with notches $a^3$, similar in character to the notches or grooves $a'$. With this arrangement the clamp can be employed in connection with tires having two retaining-bands, such as the bands 3, and, as in the previous case, the drawing together of the jaws operates to compress the bands edgewise.

From the foregoing it will be seen that I provide a device which tends to facilitate the operation of applying rubber tires to vehicle-wheels, that the same is simple and inexpensive and conveniently operated, and, furthermore, that the device can be used for putting on tires having either bands or wires.

What I claim as my invention is—

A device for use in securing elastic tires upon vehicle-wheels, comprising a couple of clamps adapted to grip the end portions of the retaining bands or wires and connected for relative adjustment by a pair of parallel adjusting-screws, each clamp consisting of a pair of jaws and an intermediate plate, the lower end portions of said jaws and plate being provided with opposing notches or grooves which coöperate in gripping and holding said bands or wires, an adjusting-screw extending through unthreaded openings in the lower portions of one jaw and the intermediate plate and engaging a threaded opening in the lower portion of the other jaw, said last-mentioned jaw having its upper portion provided with a second threaded opening, the upper portion of the intermediate plate being provided with an unthreaded opening coincident with said threaded opening in the upper portion of said jaw, and an adjusting-screw extending through said coincident openings and impinging upon the other jaw, the said intermediate plate being maintained in place and in line with the jaws by the end portion of said last-mentioned screw, substantially as described.

WILLIAM HOLMES.

Witnesses:
ARTHUR F. DURAND,
AGNES A. DEVINE.